US012331224B2

(12) United States Patent
Striewing (10) Patent No.: US 12,331,224 B2
(45) Date of Patent: Jun. 17, 2025

(54) TWO-PART EPOXY COMPOSITIONS FOR ADHERENT COATINGS OF STORAGE ARTICLES

(71) Applicant: SWIMC LLC, Cleveland, OH (US)

(72) Inventor: Matthew H. Striewing, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 132 days.

(21) Appl. No.: 17/778,639

(22) PCT Filed: Nov. 20, 2020

(86) PCT No.: PCT/US2020/061454
§ 371 (c)(1),
(2) Date: May 20, 2022

(87) PCT Pub. No.: WO2021/102229
PCT Pub. Date: May 27, 2021

(65) Prior Publication Data
US 2022/0411679 A1  Dec. 29, 2022

Related U.S. Application Data

(60) Provisional application No. 62/938,541, filed on Nov. 21, 2019.

(51) Int. Cl.
*C09J 163/10* (2006.01)
*C09J 7/10* (2018.01)

(52) U.S. Cl.
CPC ............. *C09J 163/10* (2013.01); *C09J 7/10* (2018.01); *C09J 2301/312* (2020.08)

(58) Field of Classification Search
None
See application file for complete search history.

(56) References Cited

U.S. PATENT DOCUMENTS

| 4,956,423 A * | 9/1990 | Lee .................. C08L 79/08 525/434 |
| 5,229,438 A | 7/1993 | Ishida et al. |
| 10,344,160 B1 | 7/2019 | Tsang et al. |
| (Continued) | | |

FOREIGN PATENT DOCUMENTS

| CN | 1867602 A | 11/2006 |
| CN | 106536624 A | 3/2017 |
| (Continued) | | |

OTHER PUBLICATIONS

Anon, "Commission Regulation (EU) 2018/213 of Feb. 12, 2018" Official Journal of the European Union, Feb. 12, 2018, 7 pages.

(Continued)

*Primary Examiner* — Michael N Orlando
*Assistant Examiner* — Abhishek A Patwardhan
(74) *Attorney, Agent, or Firm* — Merchant & Gould P.C.

(57) ABSTRACT

A two-part epoxy coating composition for producing an adherent coating for articles such as large liquid storage tanks. The two-part epoxy coating composition includes a first liquid comprising a polyepoxide having a described formula and having an estrogenic agonist activity less than that of bisphenol S, and a second liquid comprising a curing agent configured to react with the polyepoxide under ambient conditions.

9 Claims, 2 Drawing Sheets

(56) References Cited

U.S. PATENT DOCUMENTS

| | | | |
|---|---|---|---|
| 2004/0176563 A1 | 9/2004 | Shinohara et al. | |
| 2013/0316109 A1* | 11/2013 | Niederst ............... | C09D 5/031 |
| | | | 220/62.12 |
| 2014/0107255 A1* | 4/2014 | Wittenbecher ......... | C08G 59/02 |
| | | | 523/400 |
| 2015/0307650 A1 | 10/2015 | Hammond et al. | |
| 2019/0031816 A1* | 1/2019 | Evans ................... | C08G 59/62 |
| 2019/0071409 A1* | 3/2019 | Kameyama ........... | C08G 59/20 |

FOREIGN PATENT DOCUMENTS

| | | |
|---|---|---|
| CN | 110078898 A | 8/2019 |
| IN | 201711036901 A | 6/2019 |
| JP | 5-279450 A | 10/1993 |
| JP | 2001019741 A | 1/2001 |
| JP | 2011-231153 A | 11/2011 |
| JP | 2019-172804 A | 10/2019 |
| WO | 2012109278 A2 | 8/2012 |
| WO | 2017079437 A1 | 5/2017 |

OTHER PUBLICATIONS

Bomgardner, "How a New Epoxy Could Boot BPA from Cans: Scientists went back to the drawing board to create a metal can lining without bisphenol A's endocrine effects," Consumer Products, vol. 97, issue 10, Mar. 5, 2019, 7 pages.

CertiChem Inc., "Test Method Nomination: MCF-7 Cell Proliferation Assay of Estrogenic Activity," National Toxicology Program Interagency Center for the Evaluation of Alternative Toxicological Methods (NICEATM), Jan. 2006, 102 pages, Retrieved from the Internet [URL: https://ntp.niehs.nih.gov/iccvam/methods/endocrine/endodocs/submdoc.pdf].

Garrison Michael D., Tsang Joseph W., Davis Matthew C., "Moisture Uptake and Thermomechanical Behavior of Epoxy-Amine Networks Derived from Ortho-Substituted Monomers", ACS Applied Polymer Materials, (2020), vol. 2, ho. 7, doi: 10.1021/acsapm.0c00322, ISSN 2637-6105, pp. 2736-2748, XP055812972.

Hara, "Curing Agents for Epoxy Resin," Three Bond Technical News, Dec. 20, 1990, 10 pages.

European Search Report in Application 20889100.2, mailed Aug. 17, 2023, 10 pages.

Haichao, "Practical adhesive formula and production technology," Chemical Engineering Press, 6 pages (in Chinese with English Translation) (2000).

International Search Report and Written Opinion for Application No. PCT/US2020/061454 mailed Mar. 2, 2021.

Liu et al., "Preparation, characterization and thermal properties of tetramethylbisphenol F epoxy resin and mixed systems," Polymer International, vol. 61, pp. 565-570, DOI 10.1002/pi.3205 (2011).

"Handbook of Plastic Bonding Technology," Edited by Cheng Zhaorui et al., China Light Industry Press, p. 44 (in Chinese with English Translation), 4 pages (Jun. 30, 1992).

Rejection Decision for Application No. 202080089978.3 mailed Feb. 26, 2025 (in Chinese with English Translation), 11 pages.

\* cited by examiner

TWO-PART EPOXY COMPOSITIONS FOR ADHERENT COATINGS OF STORAGE ARTICLES

CROSS REFERENCE TO RELATED APPLICATION

This application is a National Phase filing under 35 USC §371 of International Application No. PCT/US2020/061454, filed Nov. 20, 2020, which claims benefit of U.S. Application Ser. No. 62/938,541, filed Nov. 21, 2019, the entire contents of which are incorporated herein by reference.

FIELD OF INVENTION

Two-part liquid epoxy coating compositions including coating compositions for use in adherent coatings for metal structures including, but not limited to, applications for storage articles such as potable water tanks or tanks for housing hot liquids.

BACKGROUND

Protective coatings are often applied to the interior of articles such as holding tanks, vessels, rail cars, bulk storage containers, pipes, valves, and other storage articles or systems. In the case of potable water and or food contact applications as well as others, there is a potential for the coating system to leach compounds from the coating into the water or foodstuff contained therein.

Various coatings compositions have been used as adherent coatings, including polyvinyl-chloride-based coatings and epoxy-based coatings incorporating 4,4'-(propane-2,2-diyl) diphenol, e.g., bisphenol A ("BPA"). Each of these coating types, however, has potential shortcomings. For example, the recycling of materials containing polyvinyl chloride or related halide-containing vinyl polymers can be problematic. There is also a desire by some to reduce or eliminate certain BPA-based compounds commonly used to formulate food-contact epoxy coatings.

BPA is precursor chemical used to manufacture bisphenol A diglycidyl ether ("BADGE"), a chemical compound of industrial significance. BADGE has been a conventional epoxy in the manufacture of materials and articles intended to come into contact with food products including water. Trace amounts of BPA if present after the manufacture of BADGE or residual within the final coating composition formulated using BADGE can potentially migrate from the coating into the food product.

In recent years, the European Chemicals Agency (ECHA) and the European Food Safety Authority (EFSA), among others, have placed specific migration limits (SML) on BPA when used as a monomer in the production of certain plastic material and prohibited its use as a precautionary measure in certain applications such as the production of infant feeding bottles.

Manufactures and consumers desire alternatives to BPA-containing materials but it has been challenging to find alternatives to BPA that can meet the performance requirements of the expected applications.

Adherent coatings, particularly those for large holding tanks, should preferably be liquid and capable of application to substrates having various contours. Such coatings should also have excellent adhesion to the substrate (e.g., metal), resist staining and other coating defects such as "popping," "blushing," or "blistering," and resist degradation over long periods of time, even when exposed to harsh environments or contents. In addition, coatings used with foodstuffs should be safe for food contact, and not adversely affect the taste of the food product. The coatings should also be capable of maintaining suitable film integrity during storage conditions, which may experience changes in operational temperatures, pressures, or content exposure.

SUMMARY

In some embodiments, this disclosure describes a two-part epoxy coating composition useful in a variety of coating applications, for example, as an adherent coating system. The adherent coating systems formulated from the two-part epoxy compositions disclosed would be of a kind suitable, but not limited to, protective coatings intended for potable water, large storage tanks, direct food contact applications, and the like. In preferred embodiments, the coating composition does not include any structural units derived from BPA, bisphenol F ("BPF"), bisphenol S ("BPS"), or any diepoxides thereof (e.g., diglycidyl ethers thereof such as BADGE). In addition, the coating composition preferably does not include any structural units derived from a polyhydric phenol having estrogenic agonist activity greater than or equal to that of BPA. More preferably, the coating composition does not include any structural units derived from a polyhydric phenol having estrogenic agonist activity greater than or equal to that of BPS.

In some embodiments, the two-part epoxy coating composition includes a first liquid comprising a polyepoxide that contains a plurality of phenylene ether segments that and a second liquid comprising a curing agent configured to react with the polyepoxide under ambient curing conditions. Once cured, the reacted polyepoxide and curing agent form a polyether polymer. In some embodiments, the phenylene ether segments include one or more substituent groups (e.g., hydrocarbon groups) that are attached to the phenylene ring preferably at an ortho or meta position, more preferably an ortho position, relative to an oxygen atom attached to the phenylene ring. While not intending to be bound by any theory, the structural arrangement of the substituent groups may sterically hinder ring attached oxygen atoms and may help avoid undesirable estrogenic agonist activity should any residual unreacted component or precursor component of the polyepoxide remain in or migrate from the composition.

In some embodiments, the two-part epoxy coating composition comprises a first liquid comprising a polyepoxide of the following formula wherein.
  each oxygen atom attached to phenylene groups in the formula is present in an ether or ester linkage;
  each $R^1$ is independently an atom other than hydrogen or group having an atomic weight of at least 15 Daltons;
  v is independently 1 to 4;

n is 0 or 1, with the proviso that if n is 0, the phenylene groups depicted in the above formula can optionally join to form a fused ring system;

w is 4 or 3 if n is 0 and the phenylene groups form the fused ring system;

$R^2$, if present, is preferably a divalent group;

t is 0 or 1;

two or more $R^1$ groups or $R^1$ and $R^2$ groups can optionally join to form one or more cyclic groups;

s is 1;

$R^3$, if present, is a divalent organic group;

each $R^4$ is independently a hydrogen atom, a halogen atom, or a hydrocarbon group that may include one or more heteroatoms; and the polyepoxide has an estrogenic agonist activity less than that of bisphenol S.

The two-part epoxy coating composition further comprises a second liquid comprising a curing agent configured to react with the polyepoxide under ambient conditions or, in some examples, elevated temperatures.

The disclosed two-part epoxy coating compositions may be useful in coating a variety of substrates, including, for example, storage articles and systems such as valves and fittings; pipes and transport lines; tanks and vessels (e.g., portable water tanks, oil tanks, hot fluid holding tanks, waste system tanks, and the like); and the like. As discussed further below, in preferred embodiments, the coating composition is useful as an adherent coating for large storage tanks holding hot liquids such as oil, water, or syrup; liquid food products; and the like.

In preferred embodiments, the coating composition is at least substantially free of mobile BPA or BADGE, and more preferably is completely free of BPA or BADGE. More preferably, the coating composition is at least substantially free, and more preferably completely free, of mobile or bound polyhydric phenols having estrogenic agonist activity greater than or equal to that of BPA or BPS.

The above summary of the disclosure is not intended to describe each embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list. Unless otherwise indicated, the structural representations included herein are not intended to indicate any particular stereochemistry and are intended to encompass all stereoisomers.

DEFINITIONS

As used herein, "a," "an," "the," "at least one," and "one or more" are used interchangeably. Thus, for example, a coating composition that comprises "a" polyether can be interpreted to mean that the coating composition includes "one or more" polyethers.

As used herein, the term "aryl group" (e.g., an arylene group) refers to a closed aromatic ring or ring system such as phenylene, naphthylene, biphenylene, fluorenylene, and indenyl, as well as heteroarylene groups (e.g., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, etc.)

As used herein, the term "bound" when used in combination with one of the aforementioned phrases in the context, e.g., of a bound compound of a polymer or other ingredient of a coating composition (e.g., a polymer that is substantially free of bound BPA) means that the polymer or other ingredient contains less than the aforementioned amount of structural units derived from the compound. For example, a polymer that is substantially free of bound BPA includes less than 1,000 ppm (or 0.1% by weight), if any, of structural units derived from BPA.

As used herein, the term "comprises" and variations thereof do not have a limiting meaning where these terms appear in the description and claims.

As used herein, the phrase "consumable product" refers to a product intended for human or animal consumption. Consumable products may include solids, liquids, or a mixture of both. Consumable products may include, but are not limited to, water, natural oils (e.g., plant-based oils such as vegetable oil, corn oil, and the like), syrups, milk, and the like.

As used herein, the term "crosslinker" refers to a molecule capable of forming a covalent linkage between two or more molecules or between two different regions of the same molecule.

As used herein, the term "cyclic group" means a closed ring hydrocarbon group that is classified as an alicyclic group or an aromatic group, both of which can include heteroatoms.

When the phrases "does not include any," "free of" (outside the context of the aforementioned phrases), and the like are used herein, such phrases are not intended to preclude the presence of trace amounts of the pertinent structure or compound which may be present due to environmental contaminants.

As used herein, the terms "estrogenic agonist activity" or "estrogenic activity" refer to the ability of a compound to mimic hormone-like activity through interaction with an endogenous estrogen receptor, typically an endogenous human estrogen receptor. The MCF-7 cell proliferation assay is a useful test for assessing the extent to which a polyhydric phenol compound exhibits estrogenic agonist activity. The MCF-7 assay uses MCF-7, clone WS8, cells to measure whether and to what extent a substance induces cell proliferation via estrogen receptor (ER)-mediated pathways. The method is described in "Test Method Nomination: MCF-7 Cell Proliferation Assay of Estrogenic agonist activity" submitted for validation by CertiChem, Inc. to the National Toxicology Program Interagency Center for the Evaluation of Alternative Toxicological Methods (NICEA™) on Jan. 19, 2006 (available online at http://iccvam.niehs.nih.gov/methods/endocrine/endodocs/SubmDoc.pdf). As a brief summary of the assay, MCF-7, clone WS8, cells are maintained at 37° C. in RMPI (or Roswell Park Memorial Institute medium) containing Phenol Red (e.g., GIBCO Catalog Number 11875119) and supplemented with the indicated additives for routine culture. An aliquot of cells maintained at 37° C. are grown for 2 days in phenol-free media containing 5% charcoal stripped fetal bovine serum in a 25 $cm^2$ tissue culture flask. Using a robotic dispenser such as an epMotion 5070 unit, MCF-7 cells are then seeded at 400 cells per well in 0.2 ml of hormone-free culture medium in Corning 96-well plates. The cells are adapted for 3 days in the hormone-free culture medium prior to adding the chemical to be assayed for estrogenic agonist activity. The media containing the test chemical is replaced daily for 6 days. At the end of the 7-day exposure to the test chemical, the media is removed, the wells are washed once with 0.2 ml of HBSS (Hanks' Balanced Salt Solution), and then assayed to quantify amounts of DNA per well using a micro-plate modification of the Burton diphenylamine (DPA) assay, which is used to calculate the level of cell proliferation.

The term "exterior surface" refers to the substrate surface of an article that is opposite the product-contact surface. For example, the exterior surface of a holding tank refers to the outside surface of the tank that is exposed to the ambient environment. While the exterior surface of an article may intentionally or unintentionally contact the product intended to be stored, the exterior surface does not form a product-contact surface during the storage life of the article.

The terms "a first," "a second," "a third" and the like are used to distinguish between separate components and are not intended to imply a particular quantity or order unless described otherwise.

As used herein, the term "group" includes two or more atoms and is intended to be a recitation of both the particular moiety, as well as a recitation of the broader class of substituted and unsubstituted structures that includes the moiety.

A group that may be the same or different is referred to as being "independently" something. Substitution on the organic groups of the disclosed compounds is contemplated. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

As used herein, the term "metal" in reference to materials used in an article substrate includes both elemental metals and alloy metals unless indicated otherwise.

As used herein, the term "mobile" in reference to materials within the coating composition, means that the compound can be extracted from the cured coating when a coating is exposed to a test medium for some defined set of conditions, depending on the end use. An example of these testing conditions is exposure of the cured coating to HPLC-grade acetonitrile for 24 hours at 25° C. If the aforementioned phrases are used without the term "mobile" (e.g., "substantially free of BPA") then the recited polymer or composition contains less than the aforementioned amount of the compound whether the compound is mobile in the coatings or bound to a constituent of the coatings as assessed using the empirical formulas for such compound and constituent.

The term "on," when used in the context of a coating applied on a surface or substrate, includes both coatings applied directly or indirectly to the surface or substrate. Thus, for example, a second coating applied to a first layer that overlies a substrate constitutes the second coating applied on the substrate. In comparison, the phrase "directly on," when used in the context of a coating applied directly on a surface or substrate, refers to the coating in direct contact with the surface or substrate without the presence of any intermediate layers or coatings there between.

As used herein, the term "organic group" means a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups).

As used herein, the term "phenylene" as used herein refers to a six-carbon atom aryl ring (e.g., as in a benzene group) that can have any substituent groups (including, e.g., hydrogen atoms, halogens, hydrocarbon groups, oxygen atoms, hydroxyl groups, etc.). Thus, for example, the following aryl groups are each phenylene rings: $-C_6H_4-$, $-C_6H_3(CH_3)-$, and $-C_6H(CH_3)_2Cl-$. In addition, for example, each of the aryl rings of a naphthalene group are phenylene rings.

As used herein, the term "polyhydric phenol" (which includes dihydric phenols) as used herein refers broadly to any compound having one or more aryl or heteroaryl groups (more typically one or more phenylene groups) and at least two hydroxyl groups attached to a same or different aryl or heteroaryl ring. Thus, for example, both hydroquinone and 4,4'-biphenol are considered to be polyhydric phenols. As used herein, polyhydric phenols typically have six carbon atoms in an aryl ring, although it is contemplated that aryl or heteroaryl groups having rings of other sizes may be used.

Unless otherwise indicated, the term "polymer" includes both homopolymers and copolymers (e.g., polymers of two or more different monomers). Similarly, unless otherwise indicated, the use of a term designating a polymer class such as, for example, "polyether" is intended to include both homopolymers and copolymers (e.g., polyether-ester copolymers).

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the term "product-contact surface" refers to the substrate surface of a storage article (e.g., the inner surface of a holding tank) that is in contact with, or intended for contact with, a product being held or transported by the storage article. By way of example, an interior surface of a metal holding tank, or a portion thereof, is a product-contact surface even if the interior metal surface is coated with the disclosed coating composition.

As used herein, the term "substantially free" of a particular mobile or bound compound means that the recited material or composition contains less than 1,000 parts per million (ppm) of the recited mobile or bound compound. The term "essentially free" of a particular mobile or bound compound means that the recited material or composition contains less than 100 parts per million (ppm) of the recited mobile or bound compound. The term "essentially completely free" of a particular mobile or bound compound means that the recited material or composition contains less than 5 parts per million (ppm) of the recited mobile or bound compound. The term "completely free" of a particular mobile or bound compound means that the recited material or composition contains less than 20 parts per billion (ppb) of the recited mobile or bound compound. If the aforementioned phrases are used without the term "mobile" or "bound" (e.g., "substantially free of BPA"), then the recited material or composition contains less than the aforementioned amount of the compound whether the compound is mobile or bound.

As used herein, the term "unsaturated" when used in the context of a compound refers to a compound that includes at least one non-aromatic double bond.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

DETAILED DESCRIPTION

In one aspect, the present invention provides a two-part epoxy coating composition that exhibits a lower estrogenic agonist activity compared to BPA-based coatings. The coating compositions may produce an adherent coating having comparable or better physical characteristics compared to BPA-based coatings including, for example, resistance to chemical attack, blistering, discoloration, or swelling, particularly when used with hot liquids such as oils, syrups, or other chemicals. Although the ensuing discussion focuses primarily on coating end uses such as interior coatings for storage articles (e.g., portable water tanks and the like), it is contemplated that the disclosed coating composition may have utility in a variety of other end uses.

The disclosed coating compositions preferably include a two-part liquid epoxy that includes a first liquid comprising a polyepoxide (e.g., diepoxide) and a second liquid comprising one or more curing agents configured to react with the polyepoxide of Formula (I) under ambient or elevated temperature curing conditions. As described further below, the polyepoxide may be derived from ingredients including a diepoxide having one or more "hindered" aryl or heteroaryl groups, and more preferably one or more "hindered" ether phenylene groups described below (e.g., as depicted in Formula (I)) and a polyamine crosslinker. The two liquids of the coating compositions may be mixed together and coated onto a substrate surface to form at least a film-forming amount of the disclosed coating composition. The two-part liquid epoxy may be cured at under ambient conditions (e.g., room temperature or 25° C.) or under elevated temperature. Preferably, particularly for coating application of large articles, the two-part liquid epoxy is cured under ambient conditions. The coating composition may also include one or more additional ingredients such as, for example, a liquid carrier, pigments, fillers, and any other suitable optional additives that may or may not be included in the resultant polymer layer.

The disclosed coating compositions may exhibit a superior combination of coating attributes such as good substrate adhesion, good chemical resistance and corrosion protection, good fabrication properties, and a smooth and regular coating appearance free of blisters and other application or aesthetic-related defects. In some examples, the disclosed coating compositions exhibit improved coating attributes when used in storage articles (e.g., liquid holding tanks) compared to conventional BPA-based coatings. For example, the coating compositions may exhibit improved resistance against blistering and discolorization compared to BPA-based coatings when used to store hot liquids (e.g., oils, syrups, water, and the like having an average temperature of greater than 40° C.) and food based products. Additionally, or alternatively, the disclosed coating compositions may exhibit improved resistance to swelling or chemical attack compared to BPA-based coatings. While not intending to be bound by any theory, it is believed that the additional steric hindrance associated with the polyepoxides of Formula (I) provides additional resistance from heat related degradation of hot fluids as well as chemical attack.

In general, the ingredients used to make the two-part epoxy coating composition, in particular the polyepoxide, are preferably free of any dihydric phenols, or corresponding diepoxides (e.g., diglycidyl ethers ("DGE")), that exhibit an estrogenic agonist activity in an MCF-7 assay greater than or equal to that that exhibited by BPA in the assay. More preferably, the aforementioned ingredients are free of any dihydric phenols, or corresponding diepoxides, that exhibit an estrogenic agonist activity in the MCF-7 assay greater than or equal to that of BPS.

While not intending to be bound by any theory, it is believed that a dihydric phenol is less likely to exhibit any appreciable estrogenic agonist activity if the compound's chemical structure is sufficiently different from compounds having estrogenic agonist activity such as diethylstilbestrol. In some examples, this may be accomplished by using a polyepoxide derived from a polyhydric phenol that includes one or more hydroxyl groups present on each aryl ring of a polyhydric phenol compound (typically phenol hydroxyl groups of a dihydric phenol) that are sterically hindered by one or more other substituents of the aryl ring, as compared to a similar polyhydric phenol compound having hydrogen atoms present at each ortho and/or meta position. It is believed that it may be preferable to have substituent groups positioned at each ortho position relative to the aforementioned hydroxyl groups to provide optimal steric effect. It is also believed that the steric hindrance can prevent or limit the ability of a polyhydric phenol compound, and particularly a polyhydric phenol compound having two or more phenylene rings with hydroxyl groups, to act as an agonist for a human estrogen receptor.

As discussed above, the two-part epoxy coating composition includes a first liquid comprising a polyepoxide compound. Preferred polyepoxide compounds for use in the coating compositions are depicted in the below Formula (I):

Formula (I)

wherein.
each of the pair of oxygen atoms attached to phenylene groups depicted in Formula (I) is preferably present in an ether or ester linkage, more preferably an ether linkage;
H denotes a hydrogen atom, if present;
each $R^1$ is preferably independently an atom or group, each preferably having at atomic weight of at least 15 Daltons and is preferably substantially non-reactive with an epoxy group;
v is independently 1 to 4, more preferably 2, and in preferred examples each of the phenylene groups depicted in Formula (I) includes at least one $R^1$ attached to the ring at an ortho or meta position, more preferably ortho positions, relative to the oxygen atom;
n is 0 or 1, with the proviso that if n is 0, the phenylene groups depicted in Formula (I) can optionally join to form a fused ring system (e.g., a substituted naphthalene group);
w is 4 or 3 if n is 0 and the phenylene groups form a fused ring system;
$R^2$, if present, is preferably a divalent group;
t is 0 or 1, more preferably 1;
two or more $R^1$ groups or $R^1$ and $R^2$ groups can optionally join to form one or more cyclic groups;
s is 1;
$R^3$, if present, is a divalent group, more preferably a divalent organic group having an molecular weight of at least 14 Daltons; and
preferably, each $R^4$ is independently a hydrogen atom, a halogen atom, or a hydrocarbon group that may include one or more heteroatoms; more preferably each $R^4$ is a hydrogen atom.

When t is 1, the polyepoxide of Formula (I) is a segment of the below Formula (IA).

Formula (IA)

The epoxy groups (also commonly referred to as "oxirane" groups) of the polyepoxide compound may be attached to the compound via any suitable $R^3$ linkage, including, for example, ether-containing, ester-containing, or carbonate-containing linkages. Glycidyl ethers of polyhydric phenols and glycidyl esters of polyhydric phenols are preferred polyepoxide compounds, with diglycidyl ethers ("DGE") being particularly preferred.

In some embodiments, the polyepoxide compound of Formula (I) is formed via epoxidation of a dihydric phenol compound (e.g., via a reaction using epichlorohydrin or any other suitable material). In some embodiments, $R^3$ is s hydrocarbyl group, which may optionally include one or more heteroatoms. Preferred hydrocarbyl groups include groups having from one to four carbon atoms, with methylene groups being particularly preferred.

Preferred compounds of Formula (I) do not exhibit appreciable estrogenic agonist activity. While the balance of scientific data does not indicate that the presence in cured coatings of very small amounts of residual compounds having estrogenic agonist activity in an in vitro recombinant cell assay pose a human health concern, the use of compounds having no appreciable estrogenic agonist activity in such an assay may nonetheless be desirable from a public perception standpoint. Thus, in preferred embodiments, the coating composition and resultant polymer are do not include and are not derived from compounds that exhibit appreciable estrogenic agonist activity in the MCF-7 assay as discussed above.

Preferred appreciably non-estrogenic compounds exhibit a degree of estrogen agonist activity, in a competent in vitro human estrogen receptor assay, that is preferably less than that exhibited by BPA in the assay, even more preferably less than that exhibited by BPS in the assay.

Examples of appreciably non-estrogenic polyhydric phenols include polyhydric phenols that, when tested using the MCF-7 assay, exhibit a Relative Proliferative Effect ("RPE") having a logarithmic value (with base 10) of less than about −2.0, more preferably an RPE of −3 or less, and even more preferably an RPE of −4 or less. RPE is the ratio between the EC50 of the test chemical and the EC50 of the control substance 17-beta estradiol times 100, where EC50 is "effective concentration 50%" or half-maximum stimulation concentration for cell proliferation measured as total DNA in the MCF-7 assay. Thus, preferred compounds of Formula (I) exhibit an RPE of less than about −2.0, more preferably an RPE of less than about −3, and even more preferably an RPE of less than about −4.

Additionally, or alternatively the disclosed coating compositions and resultant coating layer are substantially free, more preferably completely free, of mobile or bound polyhydric phenols (and epoxides thereof) having an RPE of greater than about −2.0. More preferably, the disclosed coating compositions and resultant coating layer are substantially or completely free of mobile or bound polyhydric phenols (and epoxides thereof) having an RPE of −3 or greater (e.g., more positive). Optimally, the disclosed coating compositions and resultant coating layer are substantially or completely free of mobile or bound polyhydric phenols (and epoxides thereof) having an RPE of greater than −4.

While not intending to be bound by any theory, it is believed that the positioning of one or more $R^1$ groups at an ortho position relative to the oxygen atom depicted in Formulas (I) and (IA) may be particularly beneficial in reducing or eliminating estrogenic agonist activity. It has been found that compounds such as 4,4'-methylenebis(2,6-di-t-butylphenol), 2,2'-methylenebis(4-methyl-6-t-butylphenol), 4,4'-methylenebis(2,6-dimethylphenol), 4,4'butylidenebis(2-t-butyl-5-methylphenol), and 2,5-di-t- butylhydroquinone do not exhibit appreciable estrogenic agonist activity in a suitable in vitro assay whose results are directly correlated to the results of the MCF-7 assay through analysis of common reference compounds.

Tables 1 and 2 provided below include some compounds and their expected or measured logarithmic RPE values in the MCF-7 assay.

TABLE 1

Reference Compounds

| Compound | Log RPE |
|---|---|
| 17β-estradiol | 2.00 |
| diethylstilbestrol | about 2 |
| dienestrol | about 2 |
| Genistein | −2 |

TABLE 2

Polyhydric Compounds

| Compound | Log RPE |
|---|---|
| Bisphenol S (not preferred) | −2 |
| Bisphenol F (not preferred) | −2 |
| 4,4'-isopropylidenebis(2,6-dimethylphenol) | −2 |
| 4,4'-(propane-2,2-diyl)bis(2,6-dibromophenol) | −3 |
| 4,4'-(ethane-1,2-diyl)bis(2,6-dimethylphenol) | −3 |
| 4,4',4''-(ethane-1,1,1-triyl)triphenol | −3 |
| 4,4'-(1-phenylethane-1,1-diyl)diphenol | −3 |
| 2,2-bis(4-hydroxyphenyl)propanoic acid | less than −4 |
| 4,4'-methylenebis(2,6-dimethylphenol) | less than −4 |
| 4,4'-butylidenebis(2-t-butyl-5-methylphenol) | less than −4 |
| 4,4'-methylenebis(2,6-di-t-butylphenol) | less than −4 |
| 2,2'-methylenebis(4-methyl-6-t-butylphenol) | less than −4 |
| 4,4'-(1,4-phenylenebis(propane-2,2-diyl))diphenol | less than −4 |
| 2,2'methylenebis(phenol) | less than −4 |
| 2,5-di-t-butylhydroquinone | less than −4 |
| 2,2'-Methylenebis(6-(1-methylcyclohexyl)-4-methylphenol) | less than −4 |
| 2,2'-Methylenebis(6-t-butyl-4-methylphenol) | less than −4 |
| 2,2'Methylenebis(4-ethyl-6-t-butylphenol) | less than −4 |

The polyhydric compounds of Table 2 may undergo epoxidation to form one or more polyepoxides of Formula (I). The conversion of the dihydric phenol compounds to polyepoxides can be converted to a diepoxide using any suitable process and materials. The use of epichlorohydrin in the epoxidation process is presently preferred. Preferred examples of polyepoxides of Formula (I) include, but are not limited to epichlorohydrin epoxidation of the dihydric phenol compounds listed in Table 2 having a RPE of less than −4. By way of example, below is a diepoxide formed via an epichlorohydrin epoxidation of 4,4'-methylenebis(2,6-dimethylphenol) (also referred to as tetramethyl bisphenol F or ("TMBPF")). The resultant diepoxide is referred to as tetramethyl bisphenol F diglycidyl ether or ("TMBPFDGE").

The polyepoxides of the first liquid may be prepared in a variety of molecular weights and viscosities. Increasing the molecular weight of the polyepoxide (e.g., via upgrading the epoxide) may also increase the viscosity of the fluid. In some examples, the viscosity of the fluid may be decreased with use of a solvent, but in preferred examples the amount of solvent used in the coating composition is relatively low (e.g., less than 10 wt-%) to reduce the amount of volatile organic compounds present. Preferred polyepoxides of Formula (I) may have a number average molecular weight (Mn) of about 164 Daltons to about 600 Daltons. Additionally, or alternatively, polyepoxides of Formula (I) may have a viscosity of about 5,000 poise to about 15,000 poise at 25° C.

As mentioned above, the two-part epoxy coating composition includes a second liquid comprising a curing agent configured to react with the polyepoxide of Formula (I) under ambient conditions. The choice of particular curing agent (e.g., crosslinking resins, sometimes referred to as "crosslinkers") may depend on the particular product being formulated. Preferred curing agents are food-safe and substantially free, and more preferably completely free, of mobile or bound BPA and BADGE. Additionally, due to the manufacturing constraints of coating large surfaces such as the interior of storage tanks, preferred curing agents are those that cure under ambient conditions or 25° C. without the need to oven-bake the coated article.

In some embodiments, curing agents may include, but are not limited to, amine-based curing agents that react with the oxirane group under ambient conditions. Suitable amine-based curing agents may include polyamines (e.g., compounds having two or more oxirane-reactive amino groups); polyamide resins; mercaptans; and UV-curing agents. Examples of suitable polyamine curing agents may include, but are not limited to aliphatic amines (e.g., diethylenetriamine; diproprenediamine; triethylenetetramine ("TETA"); tetraethylenepentamine; and the like); amidoamines (e.g., curing agents available under the tradename ANCAMIDE 503 available from Evonik Corp); cyclic amines (e.g., N-aminoethylpiperazine); cycloaliphatic amines (e.g., bis-(p-aminocyclohexyl ("PACM")) methane; phenalkamines (e.g., curing agents available under the tradename CARDOLITE NC541 available from Carolite Corp); phenalkamides (e.g., curing agents available under the tradename CARDOLITE 3040 available from Carolite Corp); xylenediamines; derivatives thereof and the like. Examples of suitable polyamide resin curing agents may include, but are not limited to, curing agents available under the tradename ANCAMIDE 375A available from Evonik Corp. In some embodiments, the curing agents may include CARDOLITE NC541, CARDOLITE 3040, and TETA, or other agents that provide relatively short curing times.

Other curing agents that may be used with the two-part epoxy composition, though less preferred, include curing agents that react with the oxirane group at elevated temperatures. Such curing agents may include, for example, anhydrides; aminoplasts; dicyandiamides; blocked or unblocked isocyanates; latent curing agents; phenoplasts; certain polyamines (e.g., 2,2'-dimethyl-4,4'-methylenebis (cyclohexylamine) diaminodiphenylmethane, isophoronediamine, menthane diamine, metaphenylene diamine); or mixtures thereof. Due to the requisite heat needed to activate such curing agents (e.g., often exceeding 60° C.) they may be unsuitable for large applications such as large storage articles where it may not be possible to heat such large articles to the needed temperatures.

As discussed further below, various curing agents possessing different backbone chemistries (e.g., aliphatic, cycloaliphatic, etc.) were tested in with TMBPFDGE in comparison to BADGE epoxies. TMBPFDGE reacted well with all curing agents examined as did BADGE, albeit at a slower curing rates. Based on the studies, it is believed that conventional curing agents for BADGE are also suitable for the polyepoxides of Formula (I).

The level of curing agent used will typically depend on the type of curing agent, the number or relative reactive groups, the molecular weight of the polyepoxide, and the desired coating properties. In some embodiments, the curing agent may be combined in the coating composition at about a 0.6:1 to about a 1.2:1 stoichiometric ratio of curing agent to polyepoxide of Formula (I).

In some embodiments, one or both of the liquids of the two-part epoxy coating composition may include an organic solvent. Examples of suitable organic solvents include alcohols, aromatic or aliphatic hydrocarbons, dibasic esters, glycol ethers, ketones, esters, xylene, and the like, and combinations thereof. The solvent may help lower the viscosity of one or both of the liquids of the coating composition, or the resultant mixture for application, facilitate better mixing of the components, or slow the cure time of the mixture. In preferred examples, the coating composition is solvent-free or includes less than 20 wt-% solvent based on the total coating composition. Additionally, or alternatively, one or both of the liquids may include reactive diluents, co-resins known by those skilled in the art of formulating epoxy based coatings that can help lower the viscosity of the coating composition or the resultant mixture as needed.

In some embodiments, the coating composition may be characterized as a low VOC coating composition that preferably includes no greater than 0.4 kilograms ("kg") of volatile organic compounds ("VOCs") per liter of solids, more preferably no greater than 0.3 kg VOC per liter of solids, even more preferably no greater than 0.2 kg VOC per liter of solids, and optimally no greater than 0.1 kg VOC per liter of solids.

In some embodiments, the disclosed two-part epoxy coating composition may also include other optional ingredients that do not adversely affect the coating composition or a cured coating composition resulting therefrom. Such optional ingredients are typically included in a coating composition to enhance composition esthetics; to facilitate manufacturing, processing, handling, or application of the composition; or to further improve a particular functional property of a coating composition or a cured coating composition resulting therefrom. For example, the coating composition may optionally include adhesion promoters, anti-corrosion agents, antioxidants, catalysts, colorants, defoamers, dyes, extenders, flow control agents, fillers, light stabilizers, lubricants, oxygen-scavenging materials, pigments, rheology control materials, toners, and mixtures thereof, as required to provide the desired film properties. Each optional ingredient is preferably included in a sufficient amount to serve its intended purpose, but not in such an amount to adversely affect the coating composition or a cured coating composition resulting therefrom.

Preferred compositions are substantially free of one or both of mobile BPA or mobile BADGE, and more preferably essentially free of these compounds, even more preferably essentially completely free of these compounds, and optimally completely free of these compounds. The coating composition (and preferably each ingredient included therein) is also preferably substantially free of one or both of bound BPA and bound BADGE, more preferably essentially free of these compounds, even more preferably essentially completely free of these compounds, and optimally completely free of these compounds. In addition, preferred compositions (and preferably each ingredient included therein) are also substantially free, more preferably essentially free, even more preferably essentially completely free, and optimally completely free of one or more or all of: bisphenol S, bisphenol F, and the diglycidyl ether of bisphenol F or bisphenol S.

The two-part liquid epoxy coating compositions may have utility in a variety of end uses, including industrial coatings; marine coatings (e.g., for ship hulls; interior tanks, portable water containers, cargo tanks, ballast tanks, and the like); coatings for product-contact surfaces of storage articles including but not limited to, valves and fittings; pipes and transport lines; tanks and vessels (e.g., portable water tanks, oil tanks, hot fluid holding tanks, waste system tanks, and the like); food processing systems; waste management systems; rail car tanks; refrigerated tanks; and the like. In some embodiments, coating compositions may be used for storage articles configured to hold or transport hot liquids (e.g., liquids having a temperature greater than 40° C.) such as water, oils, syrups, and the like, which may or may not also include consumable products. For example, the coating composition may be applied to outdoor storage tanks (e.g., portable water storage tanks and the like). The exposure of such tanks to the external environment may cause the contents stored within to heat to temperatures greater than ambient conditions (e.g., greater than 40° C.).

In preferred embodiments, the coating composition is suitable for use as an adherent coating for a product-contact surface of a storage article. The storage article may include a substrate such as metal (e.g., steel, aluminum, alloy, and the like); concrete; fiberboard; plastic (e.g., polyesters such as, e.g., polyethylene terephthalates; nylons; polyolefins such as, e.g., polypropylene, polyethylene, and the like; ethylene vinyl alcohol; polyvinylidene chloride; and copolymers thereof); glass-reinforced plastics; and the like. While metal and concrete are more commonly used materials for constructing holding tanks, plastics such as polyethylene or glass-reinforced plastics have also been useful in recent years. In some embodiments, the article may include a metal substrate.

As discussed above, the two-part epoxy coating composition may be particularly useful as an adherent coating for large storage articles (e.g., tanks) configured to hold or transport hot liquids or consumable products. In some embodiments, the storage article may define a product-contact surface that defines an area of greater than 1 square meter.

The two-part epoxy coating composition may be applied to a desired article using any suitable technique. In preferred examples, particularly for application to large storage articles, the first and second liquids of the coating composition may be mixed and applied as a liquid to a surface of the article using a brush, roller, squeegee, trowel, spray application, or other suitable device. Once applied, the coating composition may be allowed to cure, preferably under ambient conditions without the need to oven-bake the article.

In some embodiments, in order to exhibit a suitable balance of coating properties for use as a product-contact coating for large storage articles, the resultant adherent coating may have a glass transition temperature ("Tg") suitable to impart a desired abrasion resistance or mechanical toughness depending on the end use. In some embodiments, the Tg of the coating may be greater than about 70° C. While not intending to be bound by theory, it is believed that it is important that the resultant adherent coating exhibit a Tg such as that described above in applications where the coating composition will be in contact with hot liquid materials (e.g., at temperatures at or above about 40° C.). Tg can be measured via differential scanning calorimetry ("DSC") or Dynamic mechanical analysis ("DMA") known to those in the art.

The disclosed two-part coating composition may be applied and cured to form layer of a mono-layer adherent coating or one or more layers of a multi-layer adherent coating system. Mono-layer or multi-layer adherent coatings may have any suitable overall coating thickness, but will typically have an overall average cured coating thickness of from about 25 to about 5000 micrometers and more typically from about 125 to about 1500 micrometers.

In some embodiments, a storage article having the disclosed two-part epoxy coating composition disposed and cured on a surface of the article is provided that includes a stored product. In some embodiments, the stored product may be a hot liquid including, for example, oils (e.g., petroleum or natural oils), syrup, water, or other fluid or a consumable product. Additionally, or alternatively, the stored product may include a cosmetic product, a medicinal product, a waste product (e.g., human waste), or the like.

TEST METHODS

Unless indicated otherwise, the following test methods were utilized in the Examples that follow.

Differential Scanning Calorimetry

Samples for differential scanning calorimetry ("DSC") testing were prepared by first applying the coating composition onto aluminum sheet panels. The panels were then baked in a Fisher Isotemp electric oven for 20 minutes at 300° F. (149° C.) to remove volatile materials. After cooling to room temperature, the samples were scraped from the panels, weighed into standard sample pans and analyzed using the standard DSC heat-cool-heat method. The samples were equilibrated at −60° C., then heated at 20° C. per minute to 200° C., cooled to −60° C., and then heated again at 20° C. per minute to 200° C. Glass transitions were calculated from the thermogram of the last heat cycle. The glass transition was measured at the inflection point of the transition.

EXAMPLES

The following examples are offered to aid in understanding the disclosure and are not to be construed as limiting the scope thereof. Unless otherwise indicated, all parts and percentages are by weight. The constructions cited were evaluated by tests as follows:

Example 1: Gel-Time Comparison Between BADGE and TMBPFDGE

Two-part epoxy compositions of bisphenol A diglycidyl ether (BADGE) (e.g., molecular weight of approximately 340 g/mol) and tetramethyl bisphenol F diglycidyl ether (TMBPFDGE) were prepared and mixed with various amine-based curing agents to compare the respective gel times of the compositions. The BADGE and TMBPFDGE monomer epoxides (e.g., molecular weight of approximately 340.4 g/mol and 368.6 g/mol respectively) were reduced to approximately 90% weight solids with xylene solvent. A 1:1 stoichiometric mix of each epoxy with each respective curing agent listed in Table 3 was prepared. Gel times were measured using 100 g mass samples with a Paul N. Gardner Co, Inc. gel time recorder model S-5154. The gel-time values reported are in minutes, along with the difference between BADGE and TMBPFDGE compositions using the same curing agent, and the percent increase in gel time from BADGE to TMBPFDGE.

TABLE 3

Gel-Time Comparison

| Curing agent | BADGE (min) | TMBPFDGE (min) | Difference (min) | Gel-Time % increase |
| --- | --- | --- | --- | --- |
| TETA | 74 | 407 | 333 | 450 |
| ANACAMINE ™ 503 (amidoamine) | 211 | 680 | 469 | 222 |
| PACM | 275 | 785 | 510 | 185 |
| ANACAMIDE 375A (polyamide) | 312 | 766 | 454 | 146 |
| CARDOLITE ™ 3040 (phenalkamide) | 198 | 568 | 370 | 187 |
| CARDOLITE ™ NC541 (phenalkamine) | 86 | 292 | 206 | 240 |
| ANACAMINE ™ 2393 (cycloaliphatic amine) | 55 | 398 | 343 | 624 |
| GABEPRO ™ GPM-830CB (mercaptan) | 16 | 98 | 82 | 513 |

While the gel-times increased for the TMBPFDGE epoxy compositions, the gel-times are still well within practical workable parameters for coating applications (e.g., coating storage tanks). While not intending to be bound by any theory, the difference in the gel-times between BADGE and TMBPFDGE is believed to be due to the steric hindrance of the methyl groups at the ortho positions relative to the oxygen attached to the ring structures in TMBPFDGE.

Example 2: Coating Application Comparisons

Representative coating compositions for potable water and food contact applications were prepared based off a modeled formula for BADGE. Liquid polyepoxides of BADGE, bisphenol F diglycidyl ether ("BPFDGE") and TMBPFDGE were respectively prepared. Due to slight differences in the equivalent weights of the liquid polyepoxides, the amount of curing agent mixed with the polyepoxide was varied it order to maintain a 1 to 0.9 epoxy to amine group ratio. Tables 4-6 show the test coating compositions for each of the polyepoxides. The pigment volume content of the test coating compositions was controlled to approximately 16 volume percent in the dried film. Further, the volatile organic content (VOC) of each formula was controlled to be approximately 150 grams per liter of the test coating compositions.

TABLE 4

BADGE test coating composition

| Component | Function | Weight % | Volume % |
| --- | --- | --- | --- |
| BADGE | polyepoxide | 53.1 | 60.3 |
| Byk A-530 (from BYK) | defoamer | 0.6 | 1.0 |
| TiO₂ | pigment | 7.7 | 2.5 |
| Minex 7 (from Sibelco) | filler pigment | 20.2 | 10.2 |
| Cabosil TS720 (from Cabot Corp) | rheology additive | 0.8 | 0.5 |
| n-butyl propionate | solvent | 10.8 | 16.3 |

TABLE 4-continued

BADGE test coating composition

| Component | Function | Weight % | Volume % |
|---|---|---|---|
| TETA | curing agent | 6.7 | 9.0 |
| ANACAMINE ™ K54 (cycloaliphatic amine) | catalyst | 0.1 | 0.1 |

TABLE 5

BPFDGE test coating composition

| Component | Function | Weight % | Volume % |
|---|---|---|---|
| BPFDGE | polyepoxide | 52.7 | 59.0 |
| Byk A-530 | defoamer | 0.6 | 1.0 |
| TiO$_2$ | pigment | 7.6 | 2.5 |
| Minex 7 | filler pigment | 19.9 | 10.2 |
| Cabosil TS720 | rheology additive | 0.8 | 0.5 |
| n-butyl propionate | solvent | 10.7 | 16.3 |
| TETA | curing agent | 7.6 | 10.3 |
| ANACAMINE ™ K54 | catalyst | 0.1 | 0.1 |

TABLE 6

TMBPFDGE test coating composition

| Component | Function | Weight % | Volume % |
|---|---|---|---|
| TMBPFDGE | polyepoxide | 53.3 | 61.1 |
| Byk A-530 | defoamer | 0.6 | 1.0 |
| TiO$_2$ | pigment | 7.8 | 2.5 |
| Minex 7 | filler pigment | 20.4 | 10.2 |
| Cabosil TS720 | rheology additive | 0.8 | 0.5 |

TABLE 6-continued

TMBPFDGE test coating composition

| Component | Function | Weight % | Volume % |
|---|---|---|---|
| n-butyl propionate | solvent | 10.9 | 16.3 |
| TETA | curing agent | 6.2 | 8.2 |
| ANACAMINE ™ K54 | catalyst | 0.1 | 0.1 |

Sample pucks of each test coating compositions were cast by adding the test coating compositions to polypropylene molds. These pucks were allowed to cure in the molds for four days at which time they were removed, flipped over to expose the underside and returned to the mold for another 3 days, for a total of seven days of cure. The pucks were then weighed using a Mettler model AE200 analytical balance, and the dimensions were measured using Fowler Tools and Instruments Pro-Max calipers. The total surface areas of the pucks were calculated based on the measured dimensions.

The individual pucks were added to glass jars and tested against various contact fluids including DI water, DI water at 150° F., corn syrup at 150° F., 50% sodium hydroxide (NaOH) at room temperature, and 50% sulfuric acid ($H_2SO_4$) at room temperature. The pucks were placed in respective jars and the contact fluid was added at a ratio of about approximately 100 mL of contact fluid per 15 cm$^2$ puck surface area. The pucks were tested in triplicate for each test coating composition in each test solution.

The pucks were each removed from test fluids at thirty and ninety days and measured for swelling and weight gain. Swelling and weight gains reported are the average and standard deviation of the three samples. Swelling was reported as a volume percent increase based on measured dimensions. The results from the tests are shown in Table 7 below.

| | 30 days Immersion | | | | 90 days Immersion | | | |
|---|---|---|---|---|---|---|---|---|
| | % Swelling | | % Weight Gain | | % Swelling | | % Weight Gain | |
| | Average | StdDev | Average | StdDev | Average | StdDev | Average | StdDev |
| BADGE formula | | | | | | | | |
| DI Water, Room Temp | 0.1512 | 0.0671 | 0.0248 | 0.0005 | 0.132 | 0.0126 | 0.0254 | 0.0004 |
| DI Water, 150° F. | 0.097 | 0.0142 | 0.0197 | 0.0007 | 0.1055 | 0.0612 | 0.031 | 0.0014 |
| Corn Syrup, 150° F. | 0.0283 | 0.0099 | 0.0005 | 0.0008 | 0.3056 | 0.0175 | −0.0087 | 0.0004 |
| 50% NaOH | 0.0086 | 0.0222 | −0.002 | 0.0012 | 0.1422 | 0.0266 | 0.0034 | 0.0007 |
| 50% H$_2$SO$_4$ | 0.0393 | 0.0136 | 0.0912 | 0.0028 | 0.2103 | 0.0136 | 0.133 | 0.0045 |
| BPFDGE formula | | | | | | | | |
| DI Water, Room Temp | 0.0189 | 0.0132 | 0.0236 | 0.0015 | 0.0735 | 0.0496 | 0.0273 | 0.0016 |
| DI Water, 150° F. | −0.0544 | 0.0613 | 0.033 | 0.0001 | 0.0598 | 0.0612 | 0.0304 | 0.0013 |
| Corn Syrup, 150° F. | −0.0825 | 0.0475 | 0.0106 | 0.0007 | 0.04 | 0.051 | 0.0034 | 0.0013 |
| 50% NaOH | 0.0617 | 0.0202 | −0.0021 | 0.0006 | 0.1483 | 0.0273 | −0.0021 | 0.0007 |
| 50% H$_2$SO$_4$ | −0.0159 | 0.0682 | 0.1064 | 0.0153 | 0.1579 | 0.0959 | 0.146 | 0.0194 |
| TMBPFDGE formula | | | | | | | | |
| DI Water, Room Temp | 0.0646 | 0.0107 | 0.0074 | 0.0001 | 0.1315 | 0.022 | 0.0062 | 0.0001 |
| DI Water, 150° F. | −0.0184 | 0.0238 | 0.0044 | 0.0006 | 0.1164 | 0.0198 | 0.0123 | 0.0018 |
| Corn Syrup, 150° F. | −0.0085 | 0.0107 | −0.0087 | 0.0003 | 0.1109 | 0.0277 | −0.0166 | 0.0008 |
| 50% NaOH | 0.0192 | 0.0032 | −0.0074 | 0.0007 | 0.0825 | 0.0553 | −0.0118 | 0.0005 |
| 50% H$_2$SO$_4$ | 0.0806 | 0.0133 | 0.0954 | 0.0075 | 0.2564 | 0.0245 | 0.144 | 0.0124 |

As indicated in Table 7, TMBPFDGE performed similarly to the BADGE and BPFDGE samples. Because the test compositions were modeled based on a conventional BADGE formulation, the results for BADGE, and therefore TMBPFDGE by comparison, are expected to comply with any necessary testing standards and be appropriate for the intended use as adherent coatings for potable water and food contact applications.

Aliquots of the immersion water at both room temperature and 150° F. conditions were examined after the 30 and 90 day immersions and examined for the presence of leached compounds. Leaching of compounds from the pucks to the immersion solution was interrogated by gas chromatography/mass spectroscopy (GC/MS). A corn syrup sample for each sample was also interrogated after 90 days.

Testing of the 30 days water immersion samples did not detect the presence of any leached materials of excipients to the formulations for any of the puck samples under GC/MS. Trace amounts of n-butanol were detected in the 30° F. and 150° F. samples and methanol was detected in the 150° F. samples in the water after 30 days ranging from 19.3 ppm to 151.5 ppm. The test results are listed in Table 8 with all amounts listed in ppm.

Figure 1A:
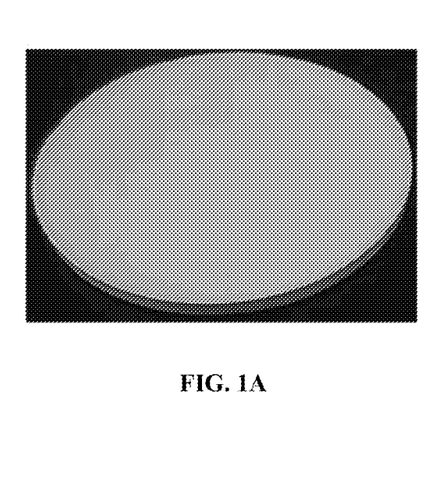
FIGS. 1A-1C illustrate a discoloration effect observed for BADGE (FIG. 1A), BPFDGE (FIG. 1B), and TMBPFDGE (FIG. 1C) test coating compositions after 90 days immersion in 50% $H_2SO_4$.
Figure 1B:
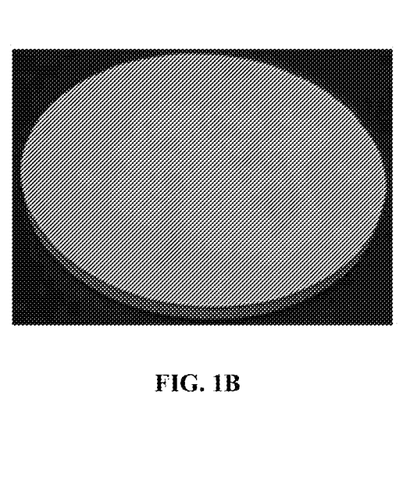
Figure 1C:
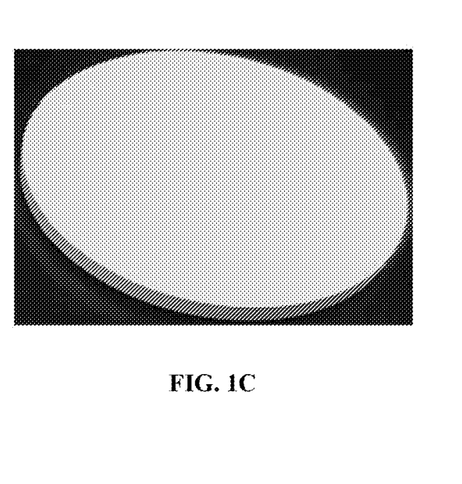

$H_2SO_4$ immersion showed strong discoloration. All three coating compositions were initially white. After 90 days of 50% $H_2SO_4$ immersion, the BADGE pucks had a salmon color while the BPFDGE puck has a prominent rust color. Surprisingly, the TMBPFDGE pucks remained substantially white, possessing an eggshell-white color. FIGS. 1A-IC illustrate the discoloration effect observed for the BADGE, BPFDGE, and TMBPFDGE coating compositions respectively. The resistance of the TMBPFDGE coating composition to discoloration shows the potential for superior chemical resistance of TMBPFDGE compared to both BADGE and BPFDGE. Further, considering that the results of the gel time testing had shown that TMBPFDGE had a slower cure rate compared to the BADGE coating composition, this suggested that if the TMBPFDGE coating compositions were allowed a similar degree of cure as the BADGE and BPFDGE coating compositions, the TMBPFDGE coating compositions may exhibit even better chemical resistance characteristics.

With respect to blistering, the BADGE puck samples after 90 days in the 150° F. DI water immersion showed visible signs of blisters. The blisters for the BADGE puck samples were characterized as being small and dense. In comparison, the BPFDGE and TMBPFDGE puck samples showed minimal or a complete lack of signs of blistering in the 150° F. DI Water immersion after 90 days.

TABLE 8

30 day Leach Test Results - values listed in ppm

| Compound | BADGE 30° F. | BADGE 150° F. | BPFDGE 30° F. | BPFDGE 150° F. | TMBPFDGE 30° F. | TMBPFDGE 150° F. |
|---|---|---|---|---|---|---|
| n-Butanol | 41.5 | 131.2 | 23.6 | 151.5 | 46.9 | 125.4 |
| Methanol | n.d. | 19.3 | n.d. | 27.0 | n.d. | 24.5 |

While n-butanol is a material foreign to any of the test coating compositions, it is theorized that the n-butanol could be a decomposition product of residual butyl-propionate solvent used in the composition.

The 90 day immersion samples also showed trace amounts of n-butanol and methanol at concentrations of less than 100 ppm for in all samples tested. The test results are listed in Table 9 with all amounts listed in ppm.

Figure 2A:
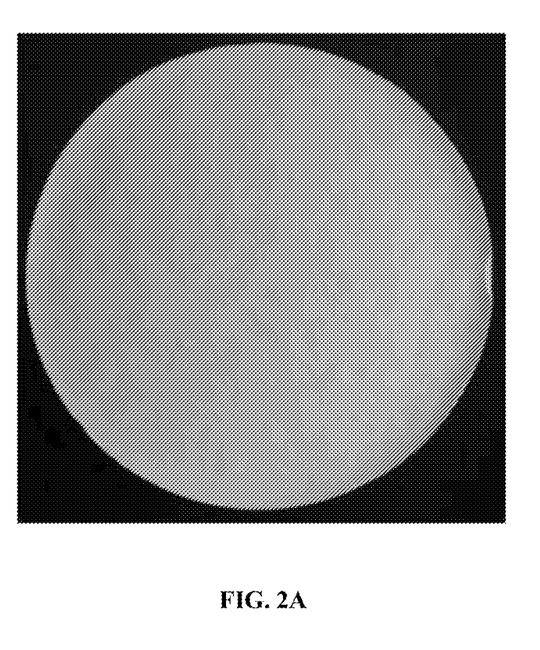
FIGS. 2A and 2B illustrate a blistering effect observed for BADGE (FIG. 2A) and TMBPFDGE (FIG. 2B) test coating compositions after 90 days immersion in 150° F. deionized (DI) water.
Figure 2B:
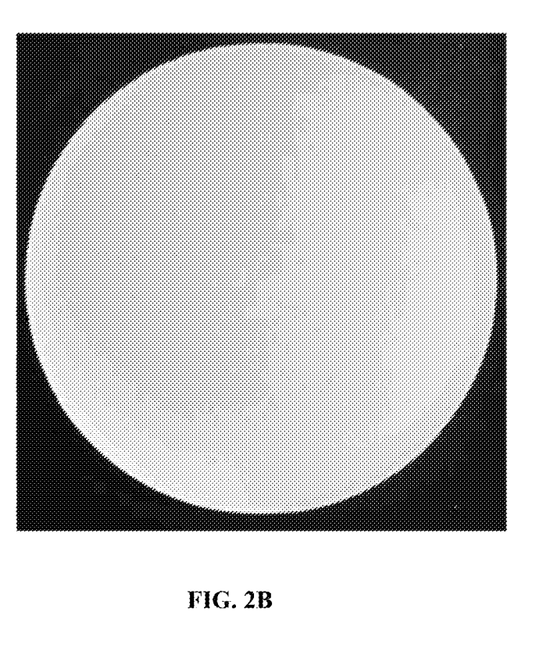

The results indicated that the TMBPFDGE coating composition had a superior performance in high heat conditions for water containment storage compared to BADGE. FIGS. 2A and 2B show the blistering effect observed with the BADGE coating (FIG. 2A) compared to the TMBPFDGE coating (FIG. 2B). While not intending to be bound by any theory, it is believed that the additional steric hindrance within TMBPFDGE provides additional resistance from

TABLE 9

90 day Leach Test Results - values listed in ppm

| Compound | BADGE 30° F. | BADGE 150° F. | BPFDGE 30° F. | BPFDGE 150° F. | TMBPFDGE 30° F. | TMBPFDGE 150° F. |
|---|---|---|---|---|---|---|
| n-Butanol | 37.3 | 28.7 | 35.7 | 91.6 | 34.0 | 63.7 |
| Methanol | n.d. | n.d. | n.d. | 29.9 | n.d. | 24.0 |

An aliquot for each corn syrup sample was also interrogated after 90 days, but leached compounds attributable to the epoxy formulations could not be detected in any of the corn syrup samples.

The coated pucks were also visually inspected for signs of discoloration and blistering. With respect to discoloration, the BADGE and BPFDGE samples after 90 days of 50% heat related degradation of hot fluids as well as chemical attack. The results demonstrated that the TMBPFDGE coating composition, in addition to having less estrogenic agonist activity, provide comparable, if not superior, performance properties in the desired end use compared to similarly formulated BADGE and BPFDGE coating compositions.

What is claimed is:

1. A two-part epoxy composition comprising:
a first liquid comprising a polyepoxide of Formula (I):

Formula (I)

wherein the polyepoxide of Formula (I) comprises tetramethyl bisphenol F diglycidyl ether;
wherein the polyepoxide of Formula (I) has an estrogenic agonist activity less than that of bisphenol S;
wherein the polyepoxide of Formula (I) has a viscosity of about 5,000 poise to about 15,000 poise at 25° C.; and
a second liquid comprising a curing agent configured to react with the polyepoxide under 25° C.;
wherein the curing agent comprises triethylenetetramine (TETA).

2. The two-part epoxy composition of claim 1, wherein the ether oxygen atom of each phenylene group depicted in Formula (I) is located at a para position relative to: (i) $R^2$ or (ii) a ring-ring covalent linkage if n is 0 and $R^2$ is absent.

3. The two-part epoxy composition of claim 1, wherein n is 1.

4. The two-part epoxy composition of claim 3, wherein $R^2$ is a methylene group.

5. The two-part epoxy composition of claim 3, wherein $R^3$ is a methylene group.

6. The two-part epoxy composition of claim 1, wherein the two-part epoxy composition is substantially free of mobile bisphenol A and a diglycidyl ether of bisphenol A.

7. The two-part epoxy composition of claim 1, wherein the two-part epoxy composition is substantially free of mobile polyhydric phenols, and epoxides thereof, having an estrogenic agonist activity equal to or greater than bisphenol S.

8. The two-part epoxy composition of claim 1, wherein the polyepoxide of Formula (I) has an atomic weight of less than 600 Daltons.

9. The two-part epoxy composition of claim 1, wherein the polyepoxide of Formula (I) constitutes at least 50% by weight of the two-part epoxy composition.

* * * * *